United States Patent
Ning (10) Patent No.: US 11,853,591 B2
(45) Date of Patent: *Dec. 26, 2023

(54) BASE DIE, MEMORY SYSTEM, AND SEMICONDUCTOR STRUCTURE

(71) Applicant: CHANGXIN MEMORY TECHNOLOGIES, INC., Hefei (CN)

(72) Inventor: Shu-Liang Ning, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,563

(22) Filed: May 1, 2022

(65) Prior Publication Data

US 2023/0136772 A1 May 4, 2023

(30) Foreign Application Priority Data

Oct. 29, 2021 (CN) .......................... 202111275387.8

(51) Int. Cl.
*G06F 3/06* (2006.01)
(52) U.S. Cl.
CPC .......... *G06F 3/0655* (2013.01); *G06F 3/0619* (2013.01); *G06F 3/0673* (2013.01)

(58) Field of Classification Search
CPC .... G06F 3/0655; G06F 3/0619; G06F 3/0673; G06F 11/1012; Y02D 110/00; G11C 29/42; G11C 11/4063
See application file for complete search history.

(56) References Cited

U.S. PATENT DOCUMENTS

| 11,416,335 | B2 | 8/2022 | Cho et al. | |
|---|---|---|---|---|
| 2012/0151294 | A1* | 6/2012 | Yoo | G06F 11/1012 714/755 |
| 2020/0294180 | A1* | 9/2020 | Koker | G06T 1/20 |

* cited by examiner

*Primary Examiner* — Hiep T Nguyen
(74) *Attorney, Agent, or Firm* — SYNCODA LLC; Feng Ma (57) ABSTRACT

A base die is configured to: receive a first data and a first encoded data in a writing phase, where the first encoded data is obtained by performing a first error correction code (ECC) encoding processing on the first data, perform a second ECC encoding processing on a first sub-data to generate a second encoded data, and transmit a second data to a memory die in the writing phase; where the second data includes the first sub-data, a second sub-data, the first encoded data, and the second encoded data; the base die is further configured to: receive the second data from the memory die in a reading phase, perform first error checking and correction processing on the first sub-data and the second encoded data, and transmit a third data in the reading phase.

16 Claims, 5 Drawing Sheets

BASE DIE, MEMORY SYSTEM, AND SEMICONDUCTOR STRUCTURE

CROSS-REFERENCE TO RELATED APPLICATION

This application claims priority to Chinese Patent Application No. 202111275387.8 filed on Oct. 29, 2021, the disclosure of which is hereby incorporated by reference in its entirety.

BACKGROUND

Semiconductor memories can be divided into non-volatile memories and volatile memories. A dynamic random access memory (DRAM), as a volatile memory, has the advantages of high storage density and high read/write speed, and is widely used in various electronic systems.

As the DRAM has an increasingly advanced process and higher storage density, data stored in the DRAM may have errors, which may seriously affect the performance of the DRAM. Therefore, the error checking and correction or error correction coding technology is usually used in the DRAM to detect or correct errors of the stored data.

SUMMARY

Embodiments of the present application relate to the technical field of semiconductors, and in particular, to a base die, a memory system, and a semiconductor structure.

According to some embodiments of the present application, in one aspect of the embodiments of the present application, a base die applied to a memory system is provided. The base die is configured to: receive a first data and a first encoded data in a writing phase, where the first encoded data is obtained by performing a first error correction code (ECC) encoding processing on the first data; perform a second ECC encoding processing on a first sub-data to generate a second encoded data, and transmit a second data to a memory die in the writing phase, where the second data includes the first sub-data, a second sub-data, the first encoded data, and the second encoded data; where the first sub-data and the second sub-data form the first data; and the base die is further configured to: receive the second data from the memory die in a reading phase, perform a first error checking and correction processing on the first sub-data and on the second encoded data, and transmit a third data in the reading phase; where the third data includes the second sub-data, the first encoded data, and the first sub-data on which the first error checking and correction processing has been performed.

According to some embodiments of the present application, in another aspect of the embodiments of the present application, a memory system is provided, including a processor, a base die, and a memory die; where the processor is configured to perform a first ECC encoding processing on a first data in a writing phase to generate a first encoded data, and transmit a first sub-data, a second sub-data, and the first encoded data to the base die, where the first sub-data and the second sub-data form the first data. The base die is configured to receive the first data and the first encoded data in the writing phase, perform a second ECC encoding processing on the first sub-data to generate a second encoded data, and transmit a second data to the memory die in the writing phase, where the second data includes the first sub-data, the second sub-data, the first encoded data, and the second encoded data; and receive the second data from the memory die in a reading phase, perform a first error checking and correction processing on the first sub-data and on the second encoded data, and transmit a third data to the processor in the reading phase, where the third data includes the second sub-data, the first encoded data, and the first sub-data on which the first error checking and correction processing has been performed. The memory die is configured to receive the second data in the writing phase, store the second data, and transmit the second data to the base die in the reading phase. The processor is further configured to receive the third data from the base die in the reading phase, and perform a second error checking and correction processing on the third data to obtain the first data on which the second error checking and correction processing has been performed.

According to some embodiments of the present application, in further another aspect of the embodiments of the present application, a semiconductor structure is further provided, including: a carrier substrate; and the memory system described above, where the processor and the base die are both located on a surface of the carrier substrate, and the memory die is located on a surface of the base die which is away from the carrier substrate.

BRIEF DESCRIPTION OF THE DRAWINGS

One or more embodiments are exemplified by corresponding drawings, and these exemplified descriptions do not constitute a limitation on the embodiments. Components with the same reference numerals in the drawings are denoted as similar components, and the drawings are not limited by scale unless otherwise specified.

DETAILED DESCRIPTION

Figure 1:
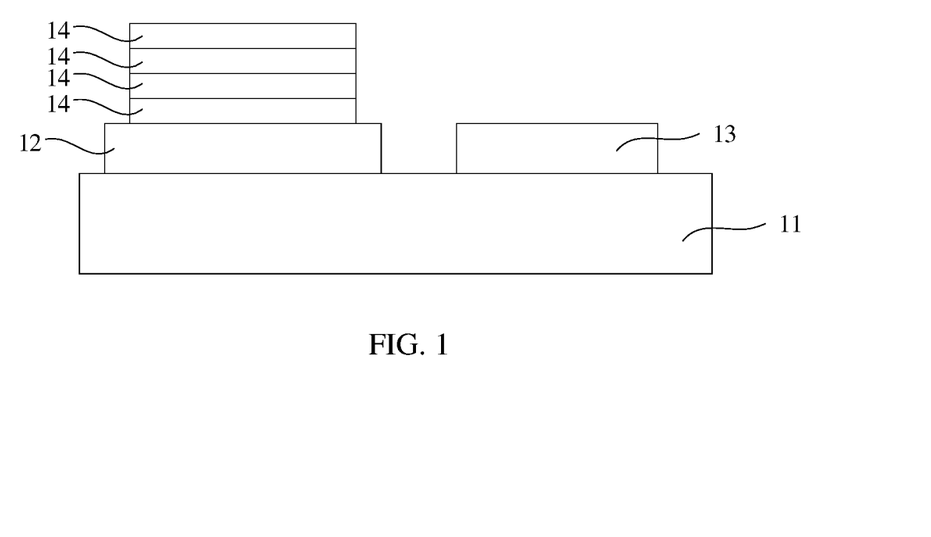
FIG. 1 is a schematic structural diagram of a semiconductor structure.
Figure 2:
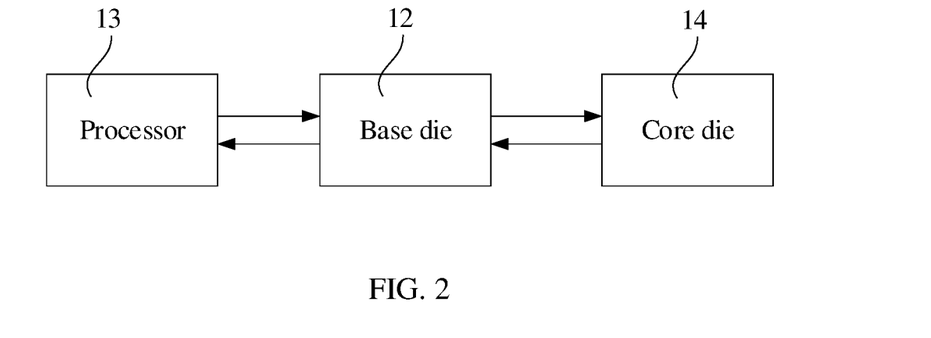
FIG. 2 is a schematic diagram of data transmission in the semiconductor structure provided in FIG. 1.

FIG. 1 is a schematic structural diagram of a semiconductor structure; FIG. 2 is a schematic diagram of data transmission in the semiconductor structure provided in FIG. 1.

Referring to FIG. 1, a semiconductor structure may include: a substrate 11; a base die 12 and a processor 13 that are located on a surface of the substrate 11; and a plurality of core dies 14 stacked on the base die 12, where the core dies 14 may be DRAM dies. Referring to FIG. 2, a data transmission process in the semiconductor structure includes: in a writing phase, the processor 13 transmits data to the base die 12, and the base die 12 transmits the data to the core die 14; before transmitting the data, the processor 13 may first perform error correction code (ECC) encoding processing on the data. In a reading phase, the core die 14 transmits data to the base die 12, and then the base die 12 transmits the data to the processor 13; the processor 13 receives the data and performs ECC decoding processing on the data, to detect and correct errors of the data.

Obviously, in the semiconductor structure, the base die 12 does not participate in the error checking and correction processing. That is, the base die 12 does not have an ECC encoding function and the corresponding error checking and correction function, and the error checking needs to be completed by the processor 13 or the core die 14. This makes the originally tight die areas of the processor 13 and the core die 14 even tighter, which affects the performance of the processor 13 and the core die 14. Therefore, the storage performance of the entire semiconductor structure still needs to be improved.

Embodiments of the present application provide a base die, a memory system, and a semiconductor structure. The base die has an error checking and correction function. In order to make the objectives, technical solutions and advantages of the embodiments of the present application clearer, the embodiments of the present application are described below with reference to the accompanying drawings. Those of ordinary skill in the art should understand that many technical details are proposed in each embodiment of the present application to help the reader better understand the present application. However, even without these technical details and various changes and modifications made based on the following embodiments, the technical solutions claimed in the present application may still be realized.

Figure 3:
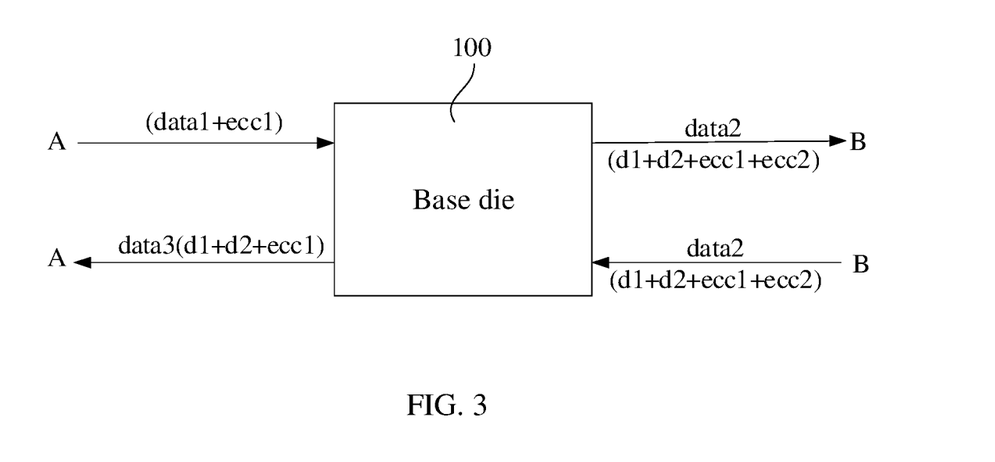
FIG. 3 is a first schematic structural diagram of a base die according to an embodiment of the present application.
Figure 4:
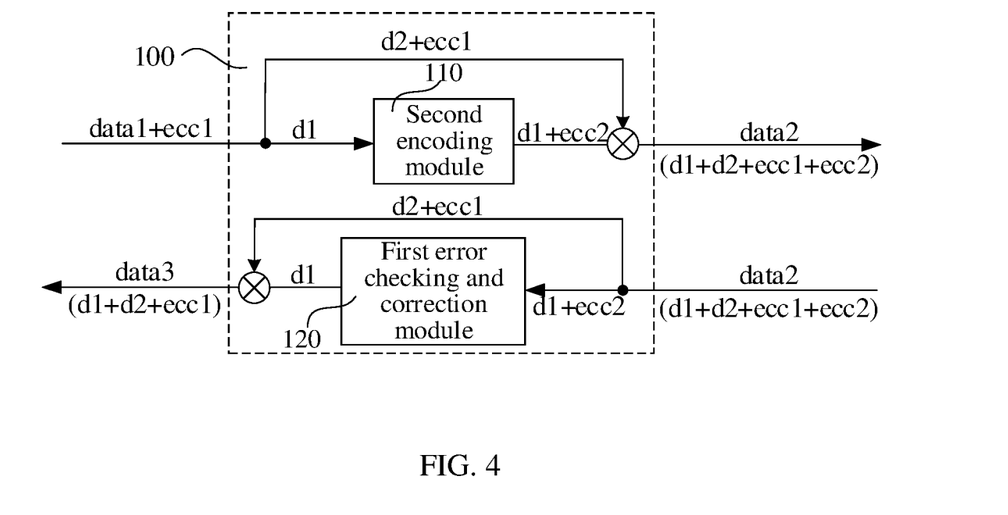
FIG. 4 is a second schematic structural diagram of a base die according to an embodiment of the present application.
Figure 5:
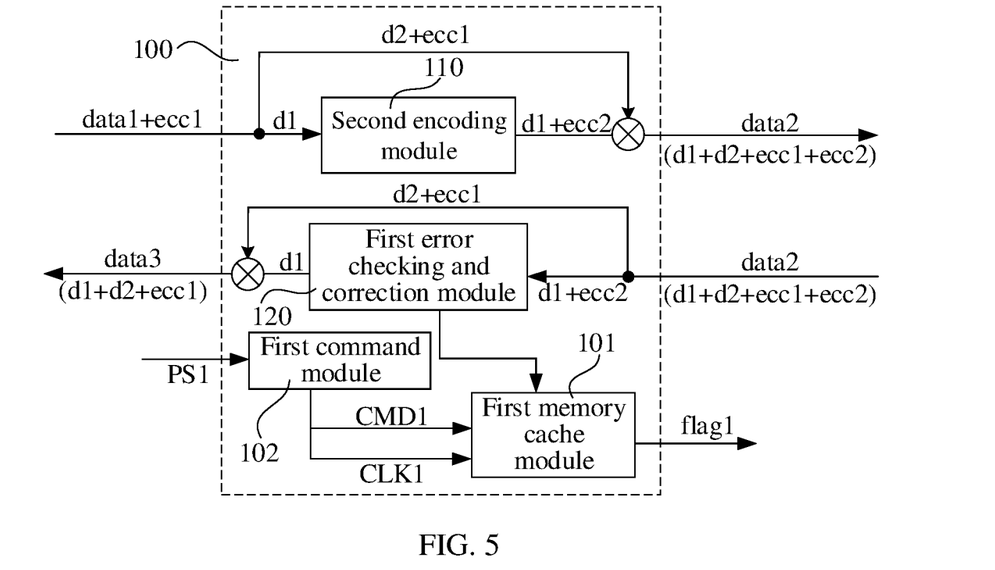
FIG. 5 is a third schematic structural diagram of a base die according to an embodiment of the present application.

FIG. 3 is a first schematic structural diagram of a base die according to an embodiment of the present application; FIG. 4 is a second schematic structural diagram of a base die according to an embodiment of the present application; and FIG. 5 is a third schematic structural diagram of a base die according to an embodiment of the present application.

The base die provided in the embodiments of the present application is described in detail below with reference to the drawings.

Referring to FIG. 3, a base die 100 is applied to a memory system. The base die 100 is configured to receive a first data data1 and a first encoded data ecc1 in a writing phase, where the first encoded data ecc1 is obtained by performing a first ECC encoding processing on the first data data1, perform a second ECC encoding processing on a first sub-data d1 to generate a second encoded data ecc2, and transmit a second data data2 to a memory die in the writing phase, where the second data data2 includes the first sub-data d1, the second sub-data d2, the first encoded data ecc1, and the second encoded data ecc2, and the first sub-data d1 and the second sub-data d2 form the first data data1. The base die 100 is further configured to receive the second data from the memory die in a reading phase, perform a first error checking and correction processing on the first sub-data d1 and the second encoded data ecc2, and transmit a third data data3 in the reading phase, where the third data data3 includes the second sub-data d2, the first encoded data ecc1, and the first sub-data d1 on which the first error checking and correction processing has been performed.

In the embodiments of the present application, the base die 100 participates in the ECC encoding processing and the error detection and correction processing in the data transmission process. Specifically, after receiving the first data1 and the first encoded data ecc1 in the writing phase, the base die 100 can transmit the first data data1, the first encoded data ecc1, and the second encoded data ecc2 to the memory die. In the reading phase, the first data data1, the first encoded data ecc1, and the second encoded data ecc2 from the memory die are transmitted to the base die 100. The base die can perform the first error checking and correction processing on the first sub-data d1 and the second encoded data ecc2, and transmit the first sub-data d1 on which the first error checking and correction processing has been performed to the processor. Moreover, the base die 100 further transmits the second sub-data d2 and the first encoded data ecc1 to the processor. In other words, in a storage phase, the base die 100 can perform error checking and correction processing on a part of the first data data1. That is, the base die 100 can share the encoding processing function and the error checking and correction function of the processor, which helps alleviate the problem of tight die area of the processor and can make full use of the relatively sufficient die area of the base die 100. In addition, since a part of the first data data1 transmitted to the processor has been subject to error checking and correction processing once, the first data data1 on which error checking and correction processing is performed again by the processor has higher accuracy, which helps improve the RAS performance (i.e., the reliability, availability, and serviceability) of the memory system.

In some embodiments, the base die 100 performs ECC error checking and correction on only a part of the first data data1, so that the memory system can achieve a balance between the efficiency and accuracy, and also alleviate the problem of tight die area.

In some embodiments, the base die 100 may be connected between a first port A and a second port B, where the first port A is connected to a data transmission port of a processor of the memory system, and the second port B is connected to a data transmission port of a memory die of the memory system. It may be understood that, the first port A and the second port B are general terms. The first port A includes a plurality of data transmission ports, and the second port B includes a plurality of data transmission ports. The number of data transmission ports is correlated to the number of pieces of data to be transmitted by the base die 100. For example, the number of data transmission ports is the same as the number of pieces of data to be transmitted by the base die 100, and one piece of data may be transmitted through one data transmission port.

The ECC encoding processing and the error checking and correction processing are both used for implementing ECC error checking and correction, to discover and locate errors of the first data during transmission and correct the errors. In some embodiments, the ECC error checking and correction may adopt an error correction mechanism of Reed Solomon Code (RS); accordingly, the ECC encoding processing may adopt an RS encoding algorithm to generate encoded data, and decoding processing in the error checking and correction processing may adopt an RS decoding algorithm. In other embodiments, the ECC error checking and correction may adopt an error correction mechanism of Hamming code; accordingly, the ECC encoding processing may adopt a Hamming code encoding algorithm to generate encoded data, and decoding processing in the error checking and correction processing may adopt a Hamming code decoding algorithm.

In some embodiments, the first data data1 may be 256-bit data, and correspondingly, the first encoded data ecc1 may be 16-bit data. It may be understood that, in other embodiments, the first encoded data may include different numbers of bits depending on specific encoding algorithms adopted in the first ECC encoding processing. In addition, the first data data1 may include other numbers of bits, for example, 128 or 512.

In some embodiments, first sub-data d1 includes the same number of bits as the second sub-data d2, that is, the number of bits in each of the first sub-data d1 and the second sub-data d2 is half of that of the first data data1. It takes a first duration for the base die 100 to transmit the second sub-data d2 and the first encoded data ecc1 to the memory die, and it takes a second duration for the base die 100 to transmit the first sub-data d1 and the second encoded data ecc2 to the memory die. Since the first sub-data d1 and the second sub-data d2 include the same number of bits, to first duration is close to the second duration, or it even may be considered that the first duration is the same as the second duration. In this way, a time difference of transmission paths for transmitting different data to the memory die is reduced. Similarly, a time difference of transmission paths through which the base die 100 reads different data from the memory die in the reading phase is reduced, thereby improving the storage performance of the memory system, for example, improving the RAS performance of the memory system. It may be understood that, the transmission paths of different data mainly refer to transmission paths of the first sub-data d1 and the second encoded data ecc2, and transmission paths of the second sub-data d2 and the first encoded data ecc1.

Through the analysis above, it is clear that in some embodiments, the number of bits of the first encoded data ecc1 may be the same as that of the second encoded data ecc2, which helps further reduce the data transmission time difference, thereby further improving the storage performance of the memory system. For example, the first data data1 is 256-bit data; then, the first sub-data d1 is 128-bit data, the second sub-data d2 is 128-bit data, the first encoded data ecc1 is 16-bit data, and the second encoded data ecc2 is 16-bit data.

In other embodiments, the number of bits of the first sub-data may be different from that of the second sub-data.

In some embodiments, the first ECC encoding processing and the second ECC encoding processing may be implemented by different encoding algorithms. Accordingly, the first error checking and correction processing and the second error checking and correction processing that is performed by the processor are implemented by different decoding algorithms. The encoding algorithm and the corresponding decoding algorithm are collectively referred to as a compiling algorithm. In this way, the error checking and correction is implemented by different compiling algorithms, which helps further improve the accuracy of data error correction and the capability of data error checking and correction, thereby improving the reliability and security, and making it easier for the base die 100 to recognize different encoded data. For example, the first data data1 is 256-bit data, the first encoded data ecc1 is 16-bit data, the first sub-data d1 is 128-bit data, and the second encoded data ecc2 is also 16-bit data.

It should be noted that, in other embodiments, the first ECC encoding processing and the second ECC encoding processing may be implemented by the same encoding algorithm. In addition, the encoding algorithm adopted in the second ECC encoding processing corresponds to a decoding algorithm adopted in the first error checking and correction processing.

FIG. 4 is a second schematic structural diagram of a base die according to an embodiment of the present application.

Referring to FIG. 4, in some embodiments, the base die 100 may include: a second encoding module 110, configured to receive the first sub-data d1 in the writing phase, and perform the second ECC encoding processing to generate the second encoded data ecc2; and a first error checking and correction module 120, configured to receive the first sub-data d1 and the second encoded data ecc2 in the reading phase, and perform the first error checking and correction processing.

The second encoding module 110 is connected between the data transmission port of the processor and the data transmission port of the memory die, and the first sub-data d1 is transmitted to the second encoding module 110.

The first error checking and correction module 120 is connected between the data transmission port of the processor and the data transmission port of the memory die. The first error checking and correction module 120 performs the first error checking and correction processing on the first sub-data d1 and the second encoded data ecc2. Specifically, paths on which the first error checking and correction module 120 can find data errors include: a transmission path through which the second encoding module 110 writes data into the memory die, and a transmission path on which the memory die reads data to the first error checking and correction module 120.

It should be noted that, the terms "first", "second" and "third" in the embodiments of the present application are merely for descriptive distinction but are not intended to particularly limit the sequence of the corresponding features.

The working principle of the base die 100 is described in detail below with reference to FIG. 4.

In the writing phase, the first sub-data d1 in the first data data1 from the processor is transmitted to the second encoding module 110. The second encoding module 110 performs the second ECC encoding processing on the first sub-data d1 to generate the second encoded data ecc2. Then, the first sub-data d1 and the second encoded data ecc2 are written into the memory die. In addition, the base die 100 further writes the second sub-data d2 and the first encoded data ecc1 into the memory die. For example, the first data data1 includes 256 bits, and the first encoded data ecc1 includes 16 bits. The 128-bit first sub-data d1 is transmitted to the second encoding module 110, and the generated second encoded data ecc2 includes 16 bits. The 128-bit first sub-data d1 and the 16-bit second encoded data ecc2 are stored into the memory die; the 128-bit second sub-data d2 and the 16-bit first encoded data ecc1 are also stored into the memory die.

In the reading phase, the first sub-data d1 and the second encoded data ecc2 from the memory die are read and transmitted to the first error checking and correction module 120. The first error checking and correction module 120 performs the first error checking and correction processing, to obtain the first sub-data d1 on which the first error checking and correction processing has been performed. The first sub-data d1 on which the first error checking and correction processing has been performed is transmitted to the processor. In addition, the base die 100 further transmits the second sub-data d2 and the first encoded data ecc1 to the processor. For example, 256+16+16 bits of data are read from the memory die. The first error checking and correction module 120 performs the first error checking and correction processing on the 128-bit first sub-data d1 and the 16-bit second encoded data ecc2, to output the 128-bit first sub-data d1 on which the first error checking and correction processing has been performed. The 128-bit first sub-data d1 on which the first error checking and correction processing has been performed may be transmitted to the processor; the 128-bit second sub-data d2 and the first encoded data ecc1 are also transmitted to the processor through the base die 100, so that the processor can perform the second error checking and correction processing. It may be understood that, the processor performs error checking and correction on the following objects: the second sub-data d2, the first encoded data ecc1, and the first sub-data d1 on which the first error checking and correction processing has been performed.

In this way, in the reading phase, the base die 100 can perform the first error checking and correction processing on the first sub-data d1 and the first encoded data ecc1, so that the first sub-data d1 transmitted back to the processor is data on which the error checking and correction processing has been performed. That is, the accuracy of a part of the first data data1 transmitted back to the processor is improved. Then, the processor performs the second error checking and correction processing on the second sub-data d2, the first sub-data d1 on which the first error checking and correction processing has been performed, and the first encoded data ecc1, to obtain the first data data1 on which the second error checking and correction processing has been performed. The first data data1 on which the second error checking and correction processing has been performed will also have higher accuracy. Moreover, the base die 100 performs error checking and correction only on the first sub-data d1, which helps ensure the data transmission efficiency.

Based on the above, the base die 100 helps improve the overall accuracy of data error checking and correction of the memory system. In addition, the memory die in the memory system does not need to have the encoding processing and the error checking and correction processing, and the base die 100 can share the encoding processing function and the error checking and correction function required by the processor, which helps improve the performance of the processor and memory die and rationally use the die area of the base die 100, thereby alleviating the pressure on die areas of the processor and the memory die, and improving the storage performance of the memory system.

In some embodiments, the base die 100 is further configured to generate a first error checking marker signal during the first error checking and correction processing, and record, based on the first error checking marker signal, an error of the first sub-data d1 and an error of the second encoded data ecc2 during transmission. Specifically, if the first sub-data d1 or the second encoded data ecc2 has an error during transmission, the first error checking marker signal is generated; if neither the first sub-data d1 nor the second encoded data ecc2 has any error during transmission, no first error checking marker signal is generated. In some embodiments, the first error checking marker signal is defined as follows: if the first sub-data d1 or the second encoded data ecc2 has an error during transmission, the first error checking marker signal is 1; if the first sub-data d1 and the second encoded data ecc2 have no error during transmission, the first error checking marker signal is 0. In other embodiments, the first error checking marker signal may alternatively defined as follows: if the first sub-data d1 or the second encoded data ecc2 has an error during transmission, the first error checking marker signal is 0; if the first sub-data d1 and the second encoded data ecc2 have no error during transmission, the first error checking marker signal is 1.

Through the first error checking marker signal, it can be learned whether the first sub-data d1 or the second encoded data ecc2 transmitted on the data transmission path from the processor to the base die 100 has an error in the writing phase, and whether the first sub-data d1 or the second encoded data ecc2 transmitted on the data transmission path from the memory die to the base die has an error in the reading phase.

As shown in FIG. 5, FIG. 5 is a third schematic structural diagram of a base die according to an embodiment of the present application. In some embodiments, the base die 100 may further include: a first memory cache module 101, configured to store the error of the first sub-data d1 and the error of the second encoded data ecc2 during transmission; and a first command module 102, configured to receive a first polling instruction PS1, and generate a first command signal CMD1 and a first clock signal CLK1. The first memory cache module 101 is further configured to output a first representation signal flag1 based on the first command signal CMD1 and the first clock signal CLK1, where the first representation signal flag1 represents the error of the first sub-data d1 and the error of the second encoded data ecc2 during transmission.

In some embodiments, if no first polling instruction PS1 is received, the first memory cache module 101 only stores the error of the first sub-data d1 and the error of the second encoded data ecc2 during transmission. After receiving the first polling instruction PS1, the first command module 102 controls the first memory cache module 101 to output the first representation signal flag1 that represents the error of the first sub-data d1 or the error of the second encoded data ecc2 during transmission. The error of the first sub-data d1 or the error of the second encoded data ecc2 can be obtained based on the first representation signal flag1.

In some embodiments, the first representation signal flag1 may be a binary string. For example, if an error of the first sub-data d1 or the second encoded data ecc2 during transmission is detected, 1 is recorded; if no error of the first sub-data d1 and the second encoded data ecc2 during transmission is detected, 0 is recorded. In this way, after a period of time, the first representation signal flag1 is a binary string of 0s and 1s. In other embodiments, the first representation signal flag1 may alternatively be a decimal value. For example, the first memory cache module 101 may be a counter, and if an error of the first sub-data d1 or the second encoded data ecc2 during transmission is detected, the count is incremented by 1. In this way, after a period of time, the first representation signal flag1 is a decimal value related to the number of errors.

In some embodiments, the first memory cache module 101 may be a first input first output (FIFO) register. By using the FIFO register as the first memory cache module 101, a continuous data stream can be cached, to avoid data missing during a storage operation. In addition, the error of the first sub-data d1 or the error of the second encoded data ecc2 during transmission can be pushed and stored collectively, which can avoid frequent bus operations and help improve the data transmission speed.

In some embodiments, the first clock signal CLK1 may be generated by the first command module 102 independently; in other embodiments, the first clock signal CLK1 may alternatively be provided from the external, for example, provided by a processor that generates the first polling instruction PS1.

The base die 100 provided in the foregoing embodiment not only has a data transmission function, but also has an ECC encoding processing function and an error checking and correction processing function. In this way, the die area of the base die 100 can be effectively used, to reduce the pressure on the die areas of the processor and the memory die and save the die areas of the processor and the memory die.

The base die 100 can perform the first sub-data d1 on the second ECC encoding processing to obtain the second encoded data ecc2, and can transmit the second encoded data ecc2, the first encoded data ecc1, and the first data data1 to the memory die, so that the first error checking and correction processing is performed on the first sub-data d1 based on the second encoded data ecc2 in the reading phase. Therefore, errors (if any) of the first sub-data d1 and the second encoded data ecc2 in the writing phase or the reading phase can be detected and corrected; moreover, the second sub-data, the first encoded data ecc1, and the first sub-data d1 on which the first error checking and correction processing has been performed can be transmitted to the processor, so that the processor performs error checking and correction processing again, thereby improving the error checking and correction capability of the memory system and the accuracy of the error checking and correction.

Another embodiment of the present application further provides a memory system, where the memory system includes a processor, a memory die, and the base die provided in the foregoing embodiment. The memory system provided by another embodiment of the present application is described in detail below with reference to the drawings. It should be noted that, for the parts the same as or corresponding to those mentioned in the foregoing embodiment, reference may be made to the foregoing embodiment, and details will not be described herein again.

Figure 6:
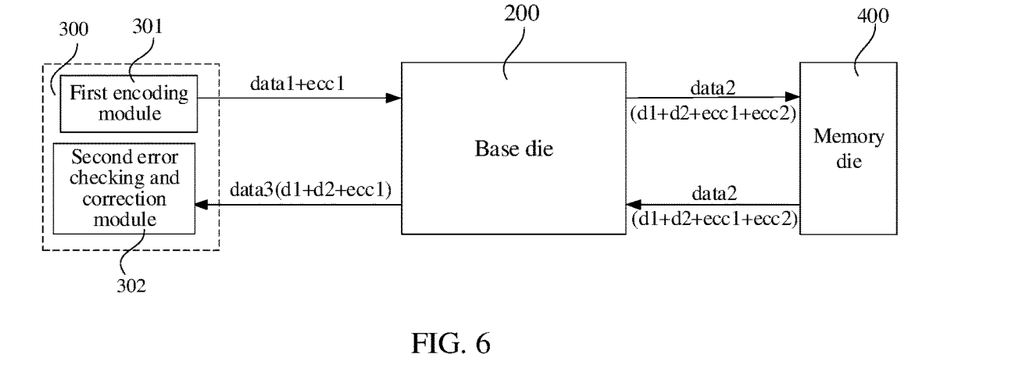
FIG. 6 is a first schematic structural diagram of a memory system according to an embodiment of the present application.

FIG. 6 is a first schematic structural diagram of a memory system according to an embodiment of the present application.

Referring to FIG. 6, the memory system includes: a base die 200, a processor 300, and a memory die 400. The processor 300 is configured to perform a first ECC encoding processing on a first data data1 in a writing phase to generate a first encoded data ecc1, and transmit first sub-data d1, the second sub-data d2, and the first encoded data ecc1 to the base die 200, where the first sub-data d1 and the second sub-data d2 form the first data data1. The base die 200 is configured to receive the first data data1 and the first encoded data ecc1 in the writing phase, perform a second ECC encoding processing on the first sub-data d1 to generate a second encoded data ecc2, and transmit a second data data2 to the memory die 400 in the writing phase, where the second data data2 includes the first sub-data d1, the second sub-data d2, the first encoded data ecc1, and the second encoded data ecc2; and receive the second data data2 from the memory die 400 in a reading phase, perform a first error checking and correction processing on the first sub-data d1 and the second encoded data ecc2, and transmit a third data data3 to the processor 300 in the reading phase, where the third data data3 includes the second sub-data d2, the first encoded data ecc1, and the first sub-data d1 on which the first error checking and correction processing has been performed. The memory die 400 is configured to receive the second data data2 in the writing phase, store the second data data2, and transmit the second data data2 to the base die 200 in the reading phase. The processor 300 is further configured to receive the third data data3 from the base die 200 in the reading phase, and perform a second error checking and correction processing on the third data data3, to obtain the first data data1 on which the second error checking and correction processing has been performed.

In the foregoing memory system, both the ECC encoding processing and the error checking and correction processing on the data can be implemented by the base die 200. Therefore, the memory die 400 does not need to perform the encoding processing and the error checking and correction processing, and the base die 200 can participate in the encoding processing and error checking and correction processing required by the processor 300, so that functions required by the processor 300 and the memory die 400 are reduced, which can make the die areas of the processor 300 and the memory die 400 less tight, thereby better improving the performance of the processor 300 and the memory die 400. For example, the reliability of the memory die 400 can be improved, thus enhancing the storage performance of the memory system. In addition, the base die 200 can perform the first error checking and correction processing on the first sub-data d1 in the first data data1; the processor 300 can perform the second error checking and correction processing on the second sub-data d2, and the processor 300 can further perform the second error checking and correction processing on the first sub-data d1 on which the error checking and correction processing has been performed, which helps improve the accuracy of the data error checking and correction.

Both the base die 200 and the processor 300 can perform the error checking and correction processing on the first data, which helps improve the data error checking and correction capability of the memory system.

In some embodiments, the memory system may be a DRAM memory system, for example, a double data rate (DDR) 4 DRAM memory system, or a DDR5 DRAM memory system. In other embodiments, the memory system may alternatively be a static random-access memory (SRAM) memory system, a NAND memory system, a NOR memory system, a FeRAM memory system, or a PcRAM memory system.

The processor 300 may include: a first encoding module 301, configured to perform the first ECC encoding processing on the first data data1 in the writing phase, to generate the first encoded data ecc1; and a second error checking and correction module 302, configured to receive the third data data3 in the reading phase, and perform the second error checking and correction processing.

The base die 200 can provide a high-speed interface for data transmission in the memory system. In addition, the base die 200 is further configured to manage and control the memory die 400. In some embodiments, the base die 200 may be configured to perform temperature monitoring and temperature management on the memory die 400, and may further be configured to perform a Memory Build-In-Self Test (MBIST) on the memory die 400 and self-repair. In addition, the base die 200 is further configured to perform error checking and correction on transmitted data.

Figure 7:
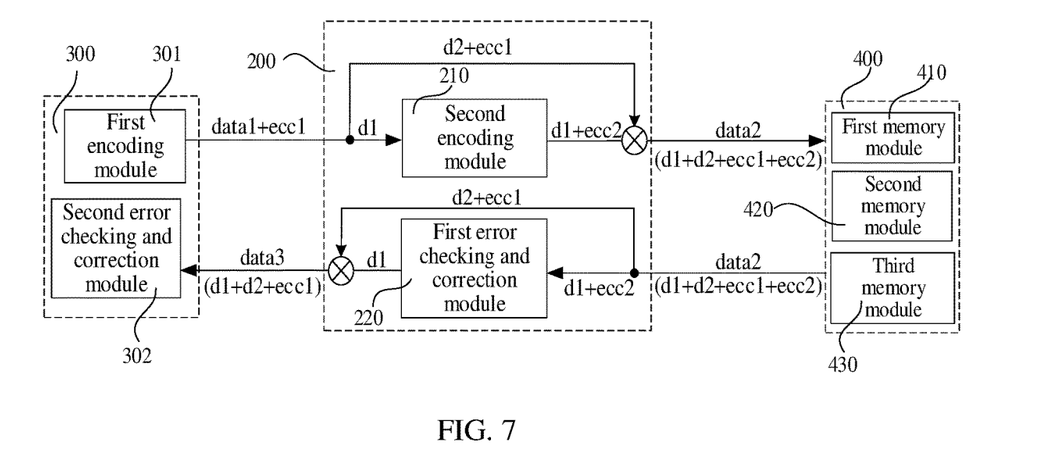
FIG. 7 is a second schematic structural diagram of a memory system according to an embodiment of the present application.

FIG. 7 is a second schematic structural diagram of a memory system according to an embodiment of the present application. Referring to FIG. 7, in some embodiments, the base die 200 may include: a second encoding module 210, configured to receive the first sub-data d1 in the writing phase, and perform the second ECC encoding processing to generate the second encoded data ecc2; and a second error checking and correction module 220, configured to receive the first sub-data d1 and the second encoded data ecc2 in the reading phase, and perform the first error checking and correction processing.

For the working principle of the memory system, reference may be made to the corresponding description of foregoing embodiment, and details are not described herein again. It may be understood that, the processor 300 can perform the second error checking and correction processing on the first sub-data d1 on which the first error checking and correction processing has been performed and the second sub-data d2.

The first ECC encoding processing and the second error checking and correction processing are implemented by a first compiling algorithm; the second ECC encoding processing and the first error checking and correction processing are implemented by a second compiling algorithm. In some embodiments, the first compiling algorithm may be different from the second compiling algorithm. The error checking and correction performed on data with different compiling algorithms helps further improve the accuracy of data error checking and correction and enhance the reliability and security.

Specifically, the second encoding module 210 and the first encoding module 301 may adopt different encoding algorithms; the first error checking and correction module 220 and the second error checking and correction module 302 may adopt different decoding algorithms.

It should be noted that, in other embodiments, the first compiling algorithm may be different from the second compiling algorithm.

Referring to FIG. 7, the memory die 400 may include: a first memory module 410, configured to store the first data data1, that is, the first sub-data d1 and the second sub-data d2; a second memory module 420, configured to store the first encoded data ecc1; and a third memory module 430, configured to store the second encoded data ecc3. For example, the first memory module 410 may store the 256-bit first data (that is, the first sub-data d1 and the second sub-data d2), the second memory module 420 may store the 16-bit first encoded data ecc1, and the third memory module 430 may store the 16-bit second encoded data ecc2.

It may be understood that, there are M data transmission channels between the processor 300 and the base die 200, and there are N data transmission channels between the base die 200 and the memory die 400, where M and N are both positive integers greater than 1, and N is greater than M. This is because that, not only the first data data1 and the first encoded data ecc1 but also the second encoded data ecc2 needs to be transmitted between the base die 200 and the memory die 400.

Figure 8:
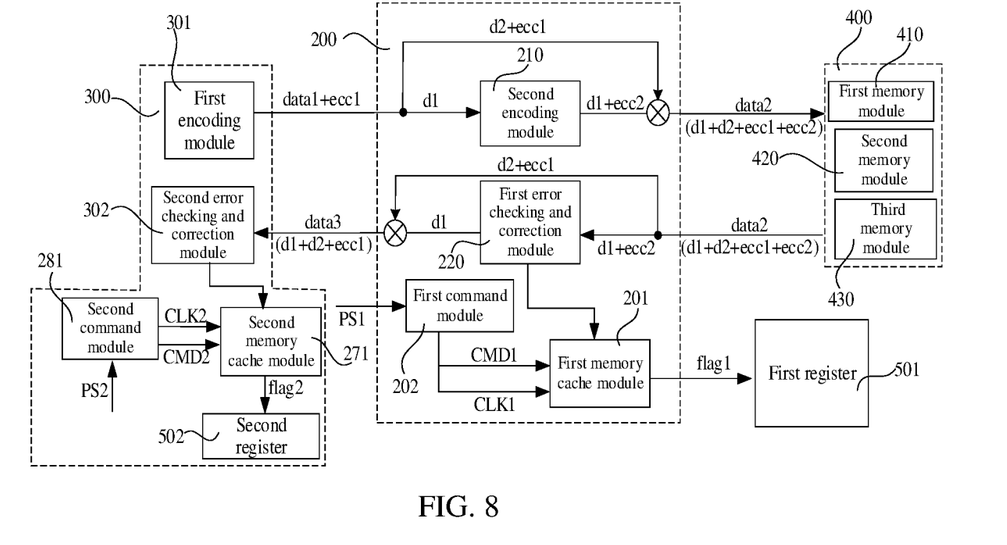
FIG. 8 is a third schematic structural diagram of a memory system according to an embodiment of the present application.

Referring to FIG. 8, FIG. 8 is a schematic structural diagram based on FIG. 7. In some embodiments, the base die 200 is further configured to generate a first error checking marker signal during the first error checking and correction processing, and record, based on the first error checking marker signal, an error of the first sub-data d1 and an error of the second encoded data ecc2 during transmission. The memory system further includes: a first register 501, configured to store the error of the first sub-data d1 and the error of the second encoded data ecc2 during transmission.

Specifically, referring to FIG. 8, the base die 200 may include: a first memory cache module 201, configured to store the error of the first sub-data d1 and the error of the second encoded data ecc2 during transmission; and a first command module 202, configured to receive a first polling instruction PS1, and generate a first command signal CMD1 and a first clock signal CLK1. The first memory cache module 201 is further configured to output a first representation signal flag1 to the first register 501 based on the first command signal CMD1 and the first clock signal CLK1, where the first representation signal flag1 represents the error of the first sub-data d1 and the error of the second encoded data ecc2 during transmission.

In some embodiments, the processor 300 may further be configured to send the first polling instruction PS1 to the first command module 202, that is, the processor 300 performs polling regularly, to control the first memory cache module 201 to output the first representation signal flag1 to the first register 501. It may be understood that, in other embodiments, the first polling instruction may alternatively be provided by an external circuit.

Referring to FIG. 8, in some embodiments, the processor 300 is further configured to generate a second error checking marker signal during the second error checking and correction processing, and record, based on the second error checking marker signal, an error of the first data data1 and an error of the first encoded data ecc1 during transmission. The memory system may further include: a second register 502, configured to store the error of the first data data1 and the error of the first encoded data ecc1 during transmission. It should be noted that the first data data1 on which the processor 300 performs the second error checking and correction processing refers to the first sub-data d1 on which the first error checking and correction processing has been performed, and the second sub-data d2.

Referring to FIG. 8, in some embodiments, the processor 300 may further include: a second memory cache module 271, configured to store the error of the first data data1 and the error of the first encoded data ecc1 during transmission; and a second command module 281, configured to receive a second polling instruction PS2, and generate a second command signal CMD2 and a second clock signal CLK2. The second memory cache module 271 is further configured to output a second representation signal flag2 to the second register 502 based on the second command signal CMD2 and the second clock signal CLK2, where the second representation signal flag2 represents the error of the first data data1 and the error of the first encoded data ecc1 during transmission.

It may be understood that, the first register 501 and the second register 502 may be the same register.

In the memory system provided by the foregoing embodiment, the base die 200 can implement the error checking and correction function. Accordingly, the memory die 400 does not need to have the error checking and correction function, and the base die 200 can assist in the error checking and correction function originally taken by the processor 300. Therefore, this helps save the space and areas of the processor 300 and the memory die 400, thereby improving the storage performance of the memory die 400 and enhancing the storage performance of the memory system. Meanwhile, both the base die 200 and the processor 300 can perform error checking and correction processing on the first data, and error checking and correction processing is performed on a part of the first data data1 twice. Therefore, the memory system has high data error checking and correction accuracy, and the RAS performance (i.e., reliability, availability, and serviceability) of the memory system is improved.

In some embodiments, the first error checking and correction module 220 and second error checking and correction module 302 can detect and correct errors on different data transmission paths, which improves the error checking and correction capability of the memory system and helps locate a specific data transmission path where an error occurs.

Accordingly, an embodiment of the present application further provides a semiconductor structure. The semiconductor structure may include the memory system provided by the foregoing embodiment. The semiconductor structure provided by the embodiment of the present application is described in detail below with reference to the drawings. It should be noted that, for the parts the same as or corresponding to those mentioned in the foregoing embodiment, reference may be made to the foregoing embodiment, and details will not be described herein again.

Figure 9:
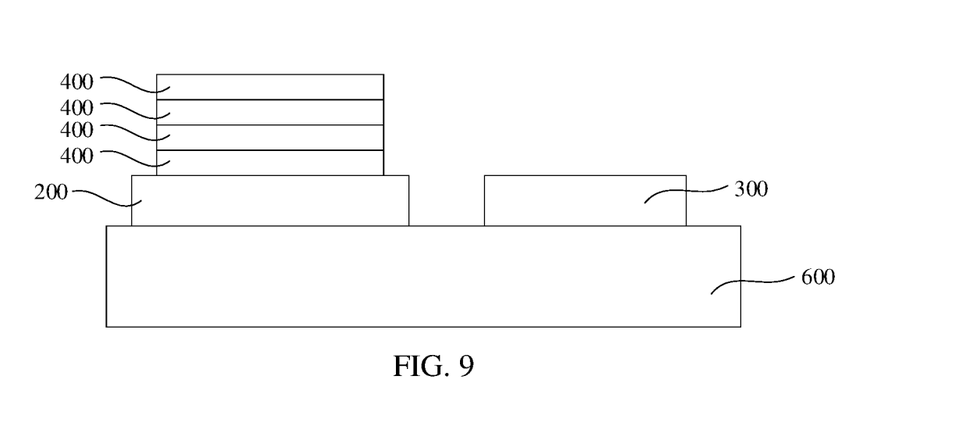
FIG. 9 is a cross-sectional schematic structural diagram of a semiconductor structure according to an embodiment of the present application.

FIG. 9 is a cross-sectional schematic structural diagram of a semiconductor structure according to an embodiment of the present application.

Referring to FIG. 9, the semiconductor structure includes: a carrier substrate 600; the memory system provided by the foregoing embodiment, where the processor 300 and the base die 200 are both located on a surface of the carrier substrate 600, and the memory die 400 is located on a surface of the base die 200 that is away from the carrier substrate 600.

The semiconductor structure may include a plurality of memory dies 400 stacked in sequence. The semiconductor structure may be a DRAM device, a SRAM device, or other memories.

In some embodiments, the carrier substrate 600 may be a printed circuit board (PCB). For the detailed description of the memory system, reference may be made to the foregoing embodiment, and details are not described herein again.

The semiconductor structure may be a 2.5-dimensional (2.5D) device. That is, the semiconductor structure is a stack structure, which helps reduce the size in a horizontal direction. In addition, the base die 200 in the semiconductor structure is used to implement the ECC error checking and correction function, thereby improving the performance of the semiconductor structure.

Those of ordinary skill in the art should understand that the above implementations are specific embodiments for implementing the present application. In practical applications, various changes may be made to the above implementations in terms of form and details without departing from the spirit and scope of the present application. Those skilled in the art may make changes and modifications to the implementations without departing from the spirit and scope of the present application. Therefore, the protection scope of the present application should be subject to the scope defined by the claims.

What is claimed is:

1. A base die, applied to a memory system, and comprising:
   a receiving module, configured to receive a first data and a first encoded data in a writing phase, wherein the first encoded data is obtained by performing a first error correction code encoding processing on the first data;
   an encoding module, configured to receive the first sub-data in the writing phase, and perform a second error correction code encoding processing on a first sub-data to generate a second encoded data and;
   a transmission module, configured to transmit a second data to a memory die in the writing phase, wherein the second data comprises the first sub-data, a second sub-data, the first encoded data, and the second encoded data; the first sub-data and the second sub-data form the first data;
   wherein, the receiving module is further configured to receive the second data from the memory die in a reading phase;
   and the base die further comprises: a first error checking and correction module, configured to receive the first sub-data and the second encoded data in the reading phase, and perform a first error checking and correction processing on the first sub-data and on the second encoded data;
   wherein, the transmission module is further configured to transmit a third data in the reading phase; wherein the third data comprises the second sub-data, the first encoded data, and the first sub-data on which the first error checking and correction processing has been performed.

2. The base die according to claim 1, wherein the first sub-data comprises a same number of bits as the second sub-data.

3. The base die according to claim 1, wherein the base die is further configured to generate a first error checking marker signal during the first error checking and correction processing, and record, based on the first error checking marker signal, an error of the first sub-data and an error of the second encoded data during transmission.

4. The base die according to claim 3, further comprising:
   a first memory cache module, configured to store the error of the first sub-data and the error of the second encoded data during transmission; and
   a first command module, configured to receive a first polling instruction, and generate a first command signal and a first clock signal;
   wherein the first memory cache module is further configured to output a first representation signal based on the first command signal and the first clock signal; the first representation signal represents the error of the first sub-data and the error of the second encoded data during transmission.

5. The base die according to claim 4, wherein the first memory cache module comprises a first input first output register.

6. The base die according to claim 1, wherein the first error correction code encoding processing and the second error correction code encoding processing are implemented by different encoding algorithms.

7. A memory system, comprising a processor, a base die, and a memory die, wherein:
   the processor is configured to: perform a first error correction code encoding processing on a first data in a writing phase to generate a first encoded data, and transmit a first sub-data, a second sub-data, and the first encoded data to the base die; wherein the first sub-data and the second sub-data form the first data;
   the base die is configured to comprise: a receiving module, configured to receive the first data and the first encoded data in the writing phase; an encoding module, configured to receive the first sub-data in the writing phase, and perform a second error correction code encoding processing on the first sub-data to generate a second encoded data; and a transmission module, configured to transmit a second data to the memory die in the writing phase, wherein the second data comprises the first sub-data, the second sub-data, the first encoded data, and the second encoded data; wherein the receiving module is further configured to receive the second data from the memory die in a reading phase; and the base die further comprises: a first error checking and correction module, configured to receive the first sub-data and the second encoded data in the reading phase, and perform a first error checking and correction processing on the first sub-data and on the second encoded data; wherein the transmission module is further configured to transmit a third data to the processor in the reading phase, wherein the third data comprises the second sub-data, the first encoded data, and the first sub-data on which the first error checking and correction processing has been performed;
   the memory die is configured to receive the second data in the writing phase, store the second data, and transmit the second data to the base die in the reading phase; and the processor is further configured to receive the third data from the base die in the reading phase, and perform a second error checking and correction processing on the third data to obtain the first data on which the second error checking and correction processing has been performed.

8. The memory system according to claim 7, wherein the processor comprises:
a first encoding module, configured to perform the first error correction code encoding processing on the first data in the writing phase to generate the first encoded data; and
a second error checking and correction module, configured to receive the third data in the reading phase and perform the second error checking and correction processing on the third data.

9. The memory system according to claim 7, wherein there are M data transmission channels between the processor and the base die, there are N data transmission channels between the base die and the memory die, M and N are both positive integers greater than 1, and N is greater than M.

10. The memory system according to claim 7, wherein the memory die comprises:
a first memory module, configured to store the first data;
a second memory module, configured to store the first encoded data; and
a third memory module, configured to store the second encoded data.

11. The memory system according to claim 7, wherein the first error correction code encoding processing and the second error checking and correction processing are implemented by a first compiling algorithm; the second error correction code encoding processing and the first error checking and correction processing are implemented by a second compiling algorithm; and the first compiling algorithm is different from the second compiling algorithm.

12. The memory system according to claim 7, wherein the base die is further configured to generate a first error checking marker signal during the first error checking and correction processing, and record, based on the first error checking marker signal, an error of the first sub-data and an error of the second encoded data during transmission; and the memory system further comprises:
a first register, configured to store the error of the first sub-data and the error of the second encoded data during transmission.

13. The memory system according to claim 12, wherein the base die comprises:
a first memory cache module, configured to store the error of the first sub-data and the error of the second encoded data during transmission; and
a first command module, configured to receive a first polling instruction, and generate a first command signal and a first clock signal;
wherein the first memory cache module is further configured to output a first representation signal to the first register based on the first command signal and the first clock signal; the first representation signal represents the error of the first sub-data and the error of the second encoded data during transmission.

14. The memory system according to claim 7, wherein the processor is further configured to generate a second error checking marker signal during the second error checking and correction processing, and record, based on the second error checking marker signal, an error of the first data and an error of the first encoded data during transmission; and the memory system further comprises:
a second register, configured to store the error of the first data and the error of the first encoded data during transmission.

15. The memory system according to claim 14, wherein the processor comprises:
a second memory cache module, configured to store the error of the first data and the error of the first encoded data during transmission; and
a second command module, configured to receive a second polling instruction, and generate a second command signal and a second clock signal;
wherein the second memory cache module is further configured to output a second representation signal to the second register based on the second command signal and the second clock signal; the second representation signal represents the error of the first data and the error of the first encoded data during transmission.

16. A semiconductor structure, comprising:
a carrier substrate; and
the memory system according to claim 7, wherein the processor and the base die are both located on a surface of the carrier substrate, and the memory die is located on a surface of the base die which is away from the carrier substrate.

* * * * *